United States Patent Office 3,196,022
Patented July 20, 1965

3,196,022
REFRACTORY PRACTICES
Ernest Paul Weaver, Pittsburgh, Pa., assignor to Harbison-Walker Refractories Company, Pittsburgh, Pa., a corporation of Pennsylvania
No Drawing. Filed Aug. 29, 1962, Ser. No. 220,131
9 Claims. (Cl. 106—38.8)

This invention relates to tar bonded refractories, and especially to those which are useful in lining vessels for the production of steel by the oxygen blowing processes. This invention is directed to subject matter disclosed but not claimed in co-pending application Serial No. 220,132, filed of even date herewith, entitled "Refractory Practices."

In a particular embodiment, the invention relates to a method of providing tar bonded refractory shapes having increased green density and increased strength after exposure to elevated temperatures.

The principal refractory materials used in lining oxygen steel making vessels include dead burned magnesite or magnesia (MgO), dead burned dolomite (MgO·CaO), dead burned lime (CaO), and mixtures thereof. Conventionally, the foregoing are bonded with pitch for better service life. Better service life with this type of refractory appears to be directly related to carbon content in the lining material. Further, experience has shown that carbon retention is directly related to the strength of the brick after being subjected to elevated coking temperatures.

It is a primary object of the invention to provide tar bonded, basic refractory shapes having increased green density and increased strength after exposure to elevated temperatures, as compared to previously available, tar bonded refractories of this type. It is another object of this invention to provide shapes containing at least one material of the group dead burned magnesia, dead burned dolomite and dead burned lime, bonded with a mixture of liquid tar and powdered pitch, and having higher strength and residual carbon content as compared to previous refractories of this type.

Briefly, according to one embodiment of the invention, it has been discovered that increased green density and strength at elevated temperatures may be had, in basic refractory shapes bonded with a mixture of liquid tar and powdered pitch, by (1) adding a particular organic additive; or (2) when at least a portion of the pitch is co-ball milled with a major portion of the fine fraction of the refractory batch (at least about 90% of the fines and 50% of the pitch is a workable ratio), with the remainder of the pitch being added at the mixer with the remainder of the batch and the liquid tar. The preferred organic additive is a small and critically controlled amount of anthracene.

In the general art to which this invention relates, commercially available tars and/or pitches are divided into three categories. The first is soft pitch or tar, which has a softening point within the range of about 80 to 100° F., the second softens within the range of 150 to 250° F., and hardens upon cooling; and the third pitch is known as hard pitch, which has a softening point at 275 to 350° F. The second is usually liquified by heating and used for brick bonding purposes. The third can be ground to a powder and handled at room temperature (about 70° F.) as a powder without promptly coalescing. As to the powdered pitch discussed below, while the separate powder particles may vary, it is preferable to have all pass a 100 mesh Tyler screen.

In addition to the characteristics above noted, for this invention, it is necessary that the tar and pitch materials be non-aqueous and cokable. The advantages of the invention can be obtained in refractory shapes of almost any basic refractory material or mixture thereof, and including such materials as dolomite, lime, magnesia, etc. and mixtures thereof. Further, it is preferable that the dolomite, lime and magnesia constituents be in a dead burned state. In the following discussion, when liquid bonding pitch is mentioned, this refers to a heated tar or pitch, which is maintained at a temperature about 100° F. above its softening point, or such other temperature as imparts fluidity to the material.

The invention will be further described in conjunction with the following specific examples, in which detailed explanation is given by way of illustration and not by way of limitation. In all of the following examples, a refractory batch composition was formed of about 60%, by weight, of a pre-burned refractory clinker and about 40% of dead burned magnesite (magnesia). The clinker and magnesite had the following typical chemical analysis:

|  | Clinker, percent | Dead Burned Magnesite, percent |
|---|---|---|
| $SiO_2$ | 9.0 | 3.5 |
| $CaO$ | 23.0 | 0.9 |
| $MgO$ | 59.5 | 94.9 |
| $Fe_2O_3$ | 4.5 | 0.3 |
| $Al_2O_3$ | 1.5 | 0.4 |
| $Cr_2O_3$ | 2.5 | 0.0 |

In the batch composition, which was an intimate admixture of the clinker and magnesia as just discussed, the clinker had the following typical screen analysis: about 30% ⅜" on 4 mesh, about 65% 4 on 28 mesh, the remainder passing 28 mesh (all Tyler mesh sizes). The magnesia was all ball mill fines, nominally −65 mesh Tyler.

In the discussion of this invention and in the examples which follow, I have referred alternately to coking and burning more or less as equivalents, since the act of burning the brick serves to coke the pitch ingredients.

Initial tests, Example I, showed that brick, of the compositions indicated (A, B and C), and coked to 2730° F., were about twice as strong as brick coked at 2000° F. Subsequent tests, Example II, were made by coking at 2730° F. while decreasing the liquid bonding pitch from 7 to 4% and increasing the powdered pitch from 0 to 3%, all parts by weight. The increase in powdered pitch appeared to cause a step-wise decrease in density, with a commensurate decrease in modulus of rupture after coking (see Mixes D through G). However, coked strength was increased about 20%, using a 2%, by weight, powdered pitch addition, when 1% thereof was co-ball milled with the magnesite fines before mixing with the other components (compare Mix F and Mix H, and compare also with Mixes H1 and J1 of Example IV).

Concomitant with the study relative to pitch addition and co-ball milling, the effects of various organic additive additions were studied. Results of these tests, Example III, showed an addition of about .7% by weight and based on the total weight of the batch, of anthracene increased the density from 2 to 5 lbs. per cu. ft., and increased strength after coking by about 25 to 30% (compare Mixes A1 and F1). Trichlorobenzene additions also appeared to provide improvement over the control mix A1.

A practical workable range for the anthracene addition is between about 0.5 and 1%, by weight, based on the total weight of the batch. As 1%, by weight, of anthracene is approached, coked strength is undesirably lessened. Thus, the anthracene addition is desirably less than about 1%, by weight, based on the total weight of the batch. About .5%, by weight, is a practical workable lower limit for the anthracene addition. This range is practical for the trichlorobenzene addition.

In the tests reported in Example IV, the considerably better properties obtained by anthracene addition and co-ball milling a portion of the pitch was proven reproducible. In the foregoing examples, the trichlorobenzene was of Chemical Grade. Technical Grade anthracene was used.

EXAMPLE I

*Effect of burning temperature and varying ratios of liquid to powdered pitch*

Base Mix: Percent
- Clinker ---------------------------------------------- 60
- Magnesite Ball Mill Fines ------------------------- 40

| Mix designation | A | | B | | C | |
|---|---|---|---|---|---|---|
| Temperature of burn, °F | 2,000 | 2,730 | 2,000 | 2,730 | 2,000 | 2,730 |
| Liquid bonding pitch, percent [1] | 7 | 7 | 6 | 6 | 5 | 5 |
| Powdered pitch addition, percent [1] | | | 1 | 1 | 2 | 2 |
| Density, p.c.f.: | | | | | | |
| Before burn | 184 | 184 | 182 | 182 | 179 | 179 |
| After burn | 175 | 173 | 173 | 170 | 172 | 171 |
| Modulus of rupture, p.s.i., after burn | 390 | 630 | 320 | 610 | 360 | 610 |

[1] Percent by weight based on the clinker-magnesite batch.

EXAMPLE II

*Effect of varying ratios of liquid to powdered pitch*

Base Mix: Percent
- Clinker ---------------------------------------------- 60
- Magnesite Ball Mill Fines ------------------------- 40

| Mix designation | D | E | F | G | H [1] |
|---|---|---|---|---|---|
| Liquid bonding pitch added, percent [2] | 7.0 | 6.0 | 5.0 | 4.0 | 5.0 |
| Powdered pitch added, percent [2] | | 1.0 | 2.0 | 3.0 | 2.0 |
| Temperature of burn, °F | 2,730 | 2,730 | 2,730 | 2,730 | 2,730 |
| Density, p.c.f.: | | | | | |
| Before burn | 181 | 181 | 179 | 176 | 180 |
| After burn | 170 | 170 | 170 | 166 | 171 |
| Modulus of rupture, p.s.i., after burn | 630 | 600 | 590 | 450 | 730 |

[1] Mix H had 1% powdered pitch co-ball milled with the magnesite fines. The remaining 1% powdered pitch was added to the pan.
[2] See Note (1), Example I.

EXAMPLE III

*Effect of various organic additives*

Base Mix: Percent
- Clinker ---------------------------------------------- 60
- Magnesite Ball Mill Fines ------------------------- 40
- Liquid Bonding Pitch ------------------------------- 5
- Powdered Pitch -------------------------------------- 2

| Mix designation | A1 | D1 | F1 |
|---|---|---|---|
| | Organic additive used | | |
| | None | 1.0%, by weight, based on weight of total batch, trichlorobenzene | 0.7%, by weight, based on weight of total batch, anthracene |
| Temperature of burn, °F | 2,730 | 2,730 | 2,730 |
| Density, p.c.f.: | | | |
| Before burn | 180 | 182 | 185 |
| After burn | 168 | 169 | 171 |
| Modulus of rupture, p.s.i., after burn | 670 | 720 | 870 |

EXAMPLE IV

*Effect of organic additives and co-ball milled magnesite-pitch*

Base Mix: Percent
- Clinker ---------------------------------------------- 60
- Magnesite Ball Mill Fines ------------------------- 40
- Liquid Bonding Pitch ------------------------------- 5
- Powdered Pitch -------------------------------------- 2

| Mix designation | H1 | I1 | J1 | K1 |
|---|---|---|---|---|
| Method of addition of ball mill pitch | 2% added at mixer | 2% co-ball milled | 1% co-ball milled, +1% added at mixer | 1% co-ball milled, +1% added at mixer |
| Organic additive used | None | None | None | +0.7% anthracene |
| Temperature of burn, °F | 2,730 | 2,730 | 2,730 | 2,730 |
| Density, p.c.f.: | | | | |
| Before burn | 180 | 183 | 182 | 185 |
| After burn | 170 | 170 | 171 | 165 |
| Modulus of rupture, p.s.i., after burn | 990 | 1,060 | 1,130 | 1,180 |

The improvement in properties obtained by the addition of .7%, by weight, of anthracene was particularly unexpected, since anthracene does not normally act as a catalyst in a coking process. Also, the amount of anthracene used is quite critical and must be less than about 1%, by weight. Anthracene is a coal tar derivative composed of three benzene rings attached in the same plane.

Having thus described the invention in detail and with sufficient particularity as to enable those skilled in the art to practice it, what is desired to have protected by letters patent is set forth in the following claims.

I claim:
1. In methods of making refractory batches suitable for manufacture of basic refractories bonded with non-aqueous tar bonding material, including the steps of mixing refractory and tar to form batches, and forming shapes from said batches, the improvement which comprises adding about 0.5 to 1% by weight, based on the total weight of the batch, of anthracene to the batches before forming the shapes to thereby increase the hot strength of resulting shapes.

2. In the methods of claim 1, said anthracene amounting to about 0.7%, by weight, based on the total weight of the batch.

3. In the methods of manufacturing refractory batches from a size graded basic refractory material in which about 50 to 70% is in a coarser fraction which rests on a 65 mesh screen and about 50 to 30% is in a fines fraction which passes a 65 mesh screen, and about 5%, by weight, based on the total weight of the size graded basic refractory, of nonaqueous bonding pitch having a softening point in the range 150 to 250° F., which bonding pitch has been heated to a temperature of at least about 100° F. above its softening point, and about 2%, by weight, based on the total weight of the basic refractory of nonaqueous powdered pitch which passes a 100 mesh screen, said powdered pitch having a softening point above about 275° F., including the steps of mixing the refractory, bonding pitch, and powdered pitch to form batches, and forming shapes from said batches, the improvement which comprises adding 0.5 to 1%, by weight, based on the total weight of the batch of anthracene to the batches before forming shapes therefrom to improve hot strength in the resulting shapes.

4. The methods of claim 3 in which said fines fraction is comprised of magnesia.

5. In the known methods of fabricating tar bonded basic refractory shapes from basic refractory batches, said batches being made in a known manner of a mixture of size graded basic refractory materials of which about 50 to 70% is a coarser fraction which rests on a 65 mesh screen, and in which the tar bonding material is a mixture of nonaqueous cokable carbonaceous bonding materials selected from the art-recognized groups: pitch having a melting point between about 150 and 250° F. which has been heated to a temperature at least about 100° F. above its softening point, and —100 mesh powdered pitch which has a softening point above about 275° F., and in which the size graded refractory and pitch mixture are mixed together while the heated pitch is still in a soft form, and formed into shapes on conventional brickmaking machinery, the improvement which comprises adding 0.5 to 1%, by weight, based on the total weight of the batch of anthracene to the batches before forming shapes therefrom in order to increase hot strength in said shapes.

6. In methods of making refractory batches suitable for manufacture of basic refractories bonded with nonaqueous tar bonding material, including the steps of mixing refractory and tar to form batches, and forming shapes from said batches, the improvement which comprises adding about 0.5 to 1%, by weight, based on the total weight of the batch, of trichlorobenzene to the batches before forming shapes therefrom in order to increase hot strength in said shapes.

7. In the methods of manufacturing refractory batches from a size graded basic refractory material in which about 50 to 70% is in a coarser fraction which rests on a 65 mesh screen and about 50 to 30% is in a fines fraction which passes a 65 mesh screen, and about 5% by weight, based on the total weight of the size graded basic refractory, of bonding pitch having a softening point in the range 150 to 250° F., which bonding pitch has been heated to a temperature of at least about 100° F. above its softening point, and about 2%, by weight, based on the total weight of the basic refractory of powdered pitch which passes a 100 mesh screen, said powdered pitch having a softening point above about 275° F., including the steps of mixing refractory, bonding pitch, and powdered pitch to form batches, and forming shapes from said batches, the improvement which comprises adding 0.5 to 1%, by weight, based on the total weight of the batch of trichlorobenzene to the batches before forming shapes therefrom in order to increase hot strength in said shapes.

8. The methods of claim 7 in which said fines fraction is comprised of magnesia.

9. In the known methods of fabricating tar bonded basic refractory shapes from basic refractory batches, said batches being made in a known manner of a mixture of size graded basic refractory materials of which about 50 to 70% is a coarser fraction which rests on a 65 mesh screen, and in which the tar bonding material is a mixture of nonaqueous cokable carbonaceous bonding materials selected from the art-recognized groups: pitch having a melting point between about 150 and 250° F. which has been heated to a temperature at least about 100° F. above its softening point, and —100 mesh powdered pitch which has a softening point above about 275° F., and in which the size graded refractory and pitch mixture are mixed together while the heated pitch is still in a soft form, and formed into shapes on conventional brickmaking machinery, the improvement which comprises adding 0.5 to 1%, by weight, based on the total weight of the batch of trichlorobenzene to the batch before forming shapes therefrom in order to increase hot strength in said shapes.

References Cited by the Examiner

UNITED STATES PATENTS

| 540,465 | 6/95 | Talbot | 106—58 |
| 569,859 | 10/96 | Cotter et al. | 106—280 |
| 1,847,805 | 3/32 | Arnot | 106—279 |
| 2,396,669 | 3/46 | Auer | 106—274 |
| 3,070,449 | 12/62 | Davies et al. | 106—281 XR |

FOREIGN PATENTS 775,087   5/57   Great Britain.

OTHER REFERENCES

Berkman, Morrell and Egloff: "Catalysis," Reinhold Publishing Corporation, New York, 1940, pages 325 and 869.

"Hackh's Chemical Dictionary," 2nd ed., P. Blakiston's Son and Co., Inc., Philadelphia, 1937, page 194.

ALEXANDER H. BRODMERKEL, *Primary Examiner.*

MORRIS LIEBMAN, *Examiner.*